Nov. 5, 1940.     N. V. SMITH     2,220,297
GREASE GUN
Filed March 24, 1939     3 Sheets-Sheet 1
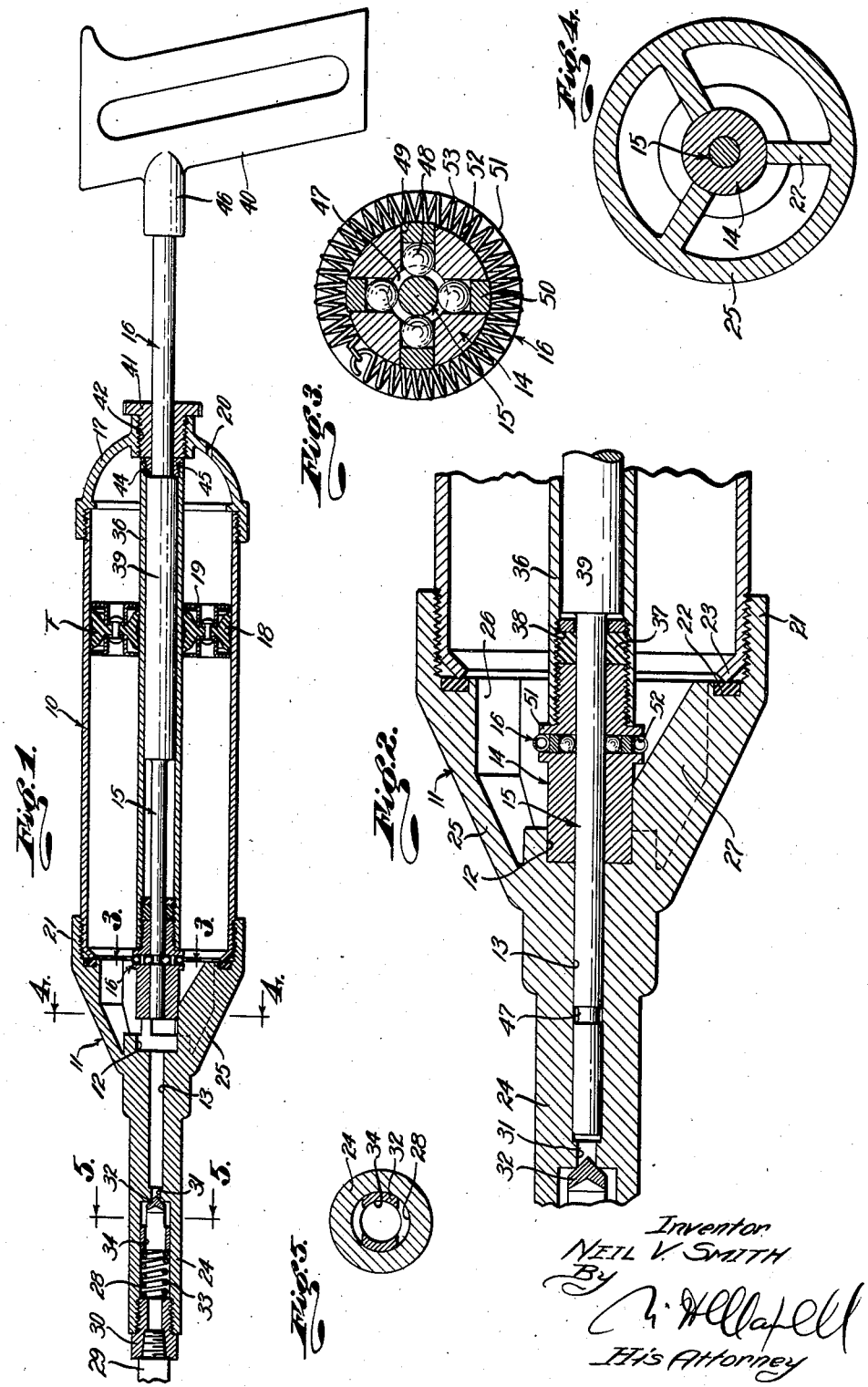
Inventor
NEIL V. SMITH
By
His Attorney

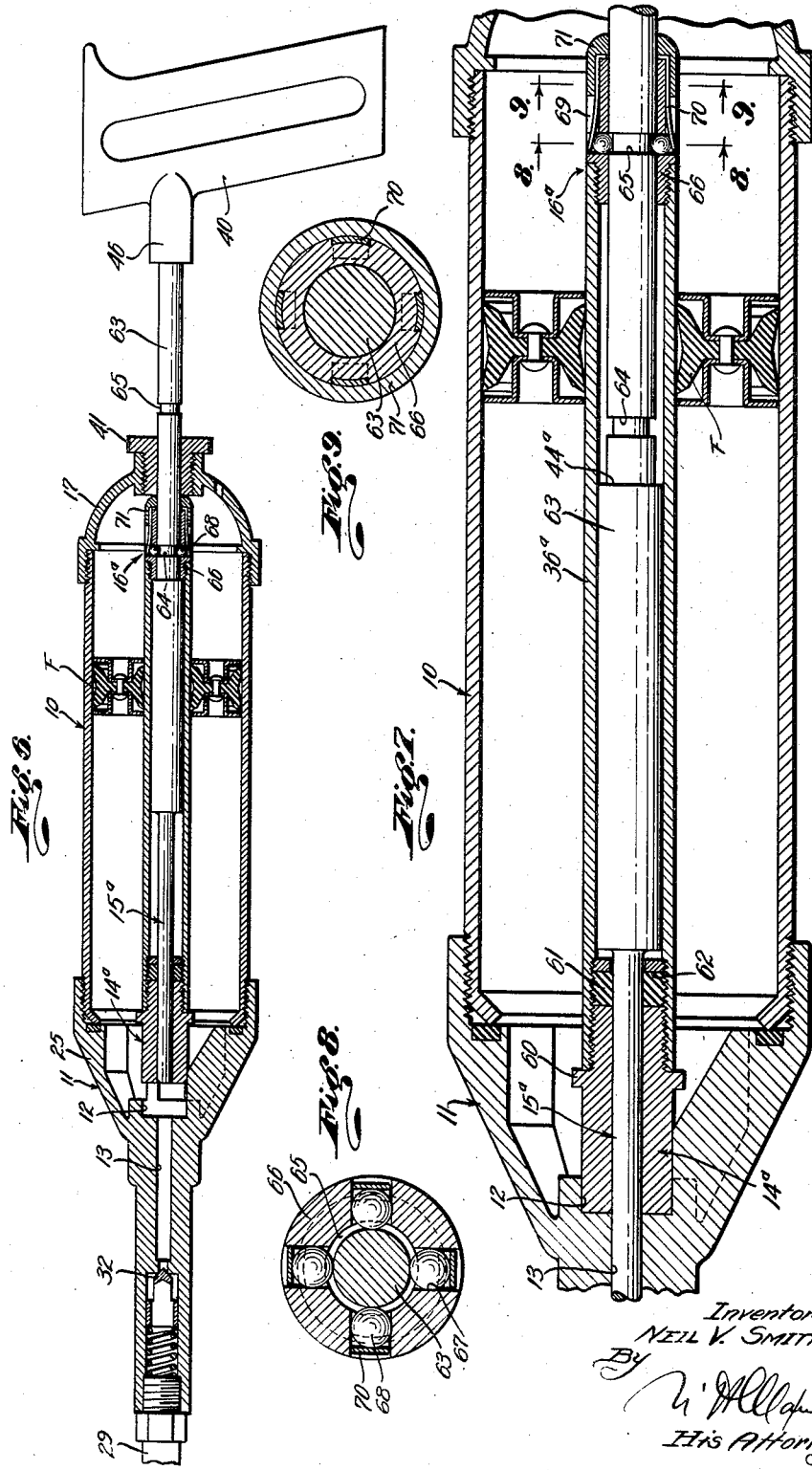

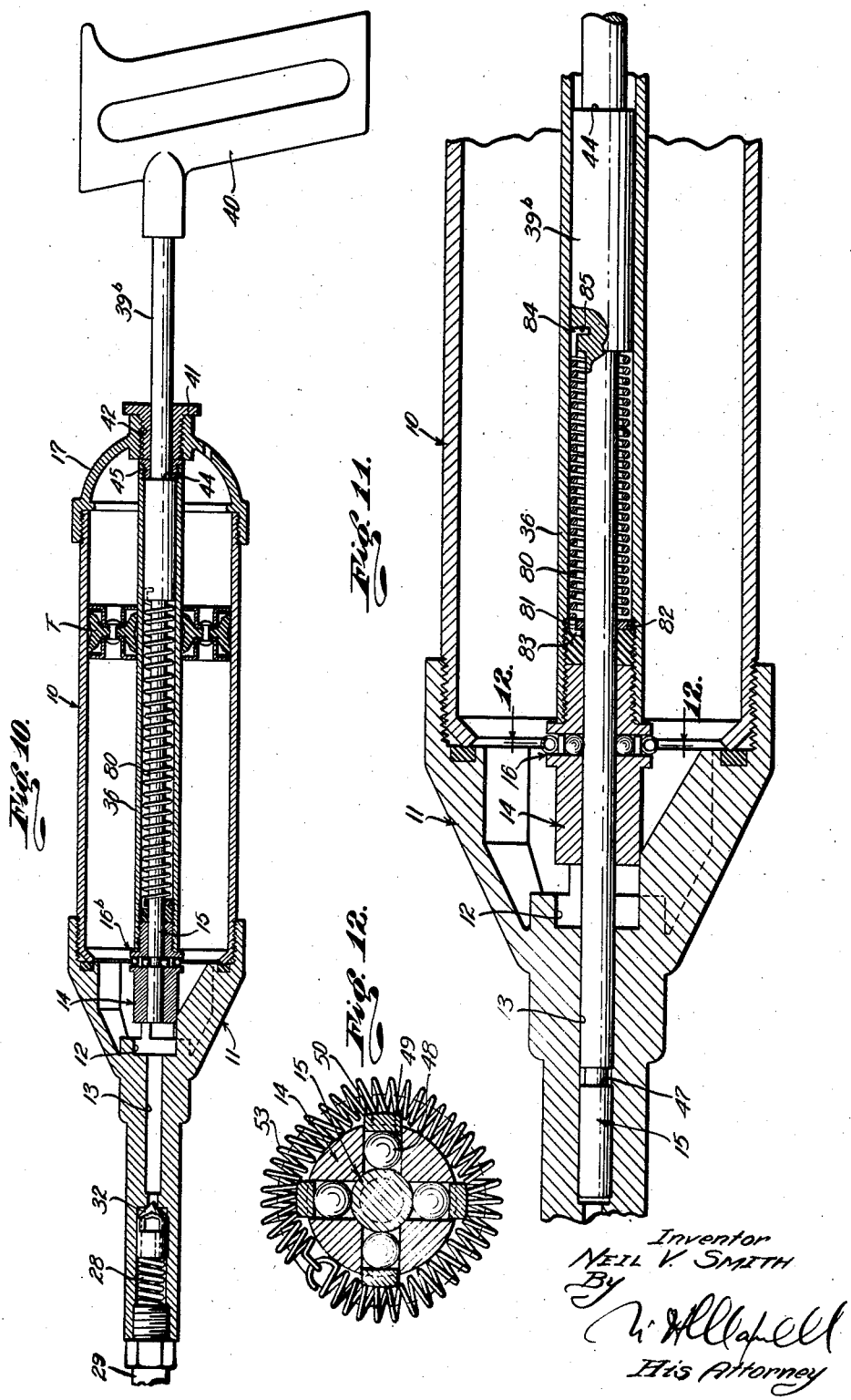

Patented Nov. 5, 1940

2,220,297

UNITED STATES PATENT OFFICE 2,220,297

GREASE GUN

Neil V. Smith, Los Angeles, Calif.

Application March 24, 1939, Serial No. 263,969

13 Claims. (Cl. 221—47.4)

This invention relates to a lubricating device and relates more particularly to a grease gun for discharging grease and other lubricants into bearings, etc., under pressure. A general object of this invention is to provide a practical, effective grease gun embodying a novel charging or priming means.

The hand operated grease guns that have been introduced usually embody a cylinder and ram mechanism for discharging the grease under pressure when a manual thrust is applied to the device, and a charging or priming means for supplying charges of lubricant to the cylinder and ram ejecting mechanism. The lubricant or grease offers substantial resistance to flow, particularly where heavy bodied lubricants are handled, and the priming means must be capable of moving a full charge of the lubricant into the cylinder before the ejecting ram begins its next ejecting stroke. In the grease guns that have gone into general use it has been customary to employ as a priming means a piston or follower behind the supply of grease and to urge the follower against the grease either by air under superatmospheric pressure or by a spring. The air under superatmospheric pressure, or the spring acting on the follower, forces the charges of lubricant or grease into the ejecting cylinder. When air pressure is thus utilized to charge the ejecting means, the pressure decreases as the operations continue, unless renewed from time to time, and the grease gun construction must be large and expensive to handle and retain a sufficient supply of the priming air. Where a spring is utilized to charge or prime the ejecting means, the priming force decreases as the operations progress and a substantial space must be provided in the grease gun barrel to contain the priming spring.

The high pressure cylinder or ejecting cylinder of a hand operated grease gun must be quite small in diameter, and of substantial length, to provide easy manual operation while developing the required discharge pressure and capacity. Prior attempts to utilize atmospheric pressure as a priming or charging force for such a gun have not proved entirely successful, as this force alone is insufficient to overcome the frictional resistance to the flow of heavy lubricant into a passageway of this nature and thereby charge the ejecting cylinder at the required operating rate.

An object of this invention is to provide a grease gun having a charging means or priming means operable to supply or introduce a full charge of lubricant to the high pressure cylinder for each discharge operation without necessitating the use of superatmospheric pressure or spring pressure.

Another object of this invention is to provide a grease gun in which atmospheric pressure is utilized to force or feed a charge of lubricant to a primary cylinder for subsequent transfer into the ejecting cylinder or high pressure cylinder. The atmospheric pressure employed as a charging force in the device of the present invention is constant, uniform, always available and inexpensively utilized, as distinguished from those methods employing varying or lessening spring pressure, or lessening superatmospheric pressure requiring special and expensive construction features.

Another object of this invention is to provide a grease gun in which the high pressure cylinder or ejecting cylinder is charged or primed during the discharge stroke or forward stroke so that full actuating force, of say 60 pounds, is available to charge the cylinder.

Another object of this invention is to provide a grease gun of the character mentioned in which the priming cylinder is larger in diameter and at least equal in capacity to the high pressure cylinder, and in full communication with the lubricant supply during the charging period, so that a full charge of lubricant may be quickly supplied to it with a minimum of frictional resistance.

Another object of this invention is to provide a grease gun involving axially aligned and directly communicating cylinders for priming and high pressure ejecting functions, and pistons or rams for the cylinders arranged in telescopic relation and releasably held against relative movement during an initial portion of the forward stroke, or until the charge of lubricant has been displaced from the priming cylinder to the high pressure cylinder by the priming ram, following which an independent action of the forwardly moving high pressure ram forces a full charge of lubricant from the high pressure cylinder under substantial pressure.

Another object of this invention is to provide a grease gun of the character mentioned in which the charging ram "restores" or leaves the charging cylinder before the high pressure ram leaves its cylinder, thereby providing an ample time interval for the priming lubricant charge to occupy the charging cylinder before the succeeding forward stroke is initiated.

Another object of this invention is to provide a grease gun of the character mentioned embodying means for immediately returning the priming ram or charging ram at the completion of its forward stroke, thereby providing a maximum time interval for the charging of the priming cylinder.

Another object of this invention is to provide a grease gun of the character mentioned embodying novel latch means or detent means controlling relative movement between the rams.

A further object of this invention is to provide a grease gun that is operable to contain a maximum supply of lubricant for a given over-all size.

The various objects and features of my invention will be fully understood from the following detailed description of typical preferred forms and applications of the invention, throughout which description reference is made to the accompanying drawings, in which:

Fig. 1 is a central longitudinal detailed sectional view of one form of device of the invention with the parts in the idle positions and showing the inner ram and the actuating stem in elevation. Fig. 2 is an enlarged fragmentary longitudinal detailed sectional view of the forward portion of the gun illustrated in Fig. 1 showing the rams in forward positions. Figs. 3, 4 and 5 are enlarged transverse detailed sectional views taken as indicated by lines 3—3, 4—4, and 5—5, respectively, on Fig. 1. Fig. 6 is a central longitudinal detailed sectional view of another form of the invention with the parts in the normal positions and showing the high pressure ram and the actuating means in elevation. Fig. 7 is an enlarged longitudinal detailed sectional view of the principal parts of the device illustrated in Fig. 6 with the rams related to initiate return movement of the priming ram. Figs. 8 and 9 are enlarged transverse detailed sectional views taken as indicated by lines 8—8 and 9—9, respectively, on Fig. 7. Fig. 10 is a central longitudinal detailed sectional view of another device of the invention with the parts in the unactuated positions, showing the high pressure ram and the actuating means in elevation. Fig. 11 is an enlarged longitudinal detailed sectional view of the intermediate portion of the gun illustrated in Fig. 10 showing the high pressure ram at the forward end of its stroke and the charging ram restored and Fig. 12 is an enlarged transverse detailed sectional view taken as indicated by line 12—12 on Fig. 11.

Figs. 1 to 4, inclusive, illustrate a form of the invention that may be said to comprise, generally, a body 10 for containing a supply of lubricant subjected to the action of atmospheric pressure, a head 11 on the forward end of the body 10 having a charging cylinder or priming cylinder 12 in receiving relation to the lubricant supply, and an ejecting cylinder or high pressure cylinder 13 in receiving relation to the cylinder 12, rams 14 and 15 operable in the cylinders 12 and 13, respectively, and operating and control means 16 for the rams 14 and 15.

The body 10 is provided to store or contain a supply of the lubricant and to support the various other elements of the device. The body 10 may be an elongate, generally cylindrical member closed at its rear end by a threaded-on cap 17. It is a feature of the invention that the supply of lubricant may occupy substantially the entire interior of the body 10 and that the lubricant is urged forwardly in the body by atmospheric pressure to flow or feed into the priming cylinder 12. It is preferred to provide a piston or follower F in the body 10 behind the body or supply of lubricant to be acted on by the atmospheric pressure. The follower F may be of any selected construction. In the case illustrated the follower F includes a resilient sealing ring 18 held between metal rings 19. The ring 18 slidably seals with the internal wall of the body 10 and seals with a central longitudinal part associated with the ram 14 as will be subsequently described. The cap 17 may be ported as at 20 to freely admit atmospheric pressure to act on the rear side of the follower F.

The head 11 is removably secured to the forward end of the body 10 and projects forwardly from the body. An annular apron or flange 21 on the rear end of the head 11 is threaded on the forward portion of the body 10. A rearwardly facing sealing gasket 22 is set in a groove in the head 11 and seals with an inturned part 23 on the forward end of the body 10 to prevent the leakage of the lubricant from between the body and head. The forward portion 24 of the head 11 is elongate and is reduced in diameter and is connected with the flange 21 by a tapered portion 25. The tapered portion 25 of the head 11 has an internal cavity or chamber 26 in full communication with the forward end of the body 10.

The communicating charging or priming cylinder 12 and high pressure or ejecting cylinder 13 are formed or provided in the head 11. In accordance with the invention the charging or priming cylinder 12 has direct full communication with the lubricant supply in the chamber 26 and the body 10. The cylinder 12 is concentric with the longitudinal axis of the head 11 and its rear end is in direct communication with the chamber 26. As illustrated, the cylinder 12 may be in the nature of a rather shallow socket of substantial diameter. A plurality of circumferentially spaced ribs 27 is provided on the interior of the head 11. The ribs 27 extend rearwardly from the cylinder 12 to center and guide the ram 14. The ejecting cylinder or high pressure cylinder 13 extends forwardly in the head 11 from the forward end of the priming cylinder 12. In the preferred construction the cylinder 13 is quite long and small in diameter to provide for the easy manual operation of the device. The cylinders 12 and 13 are related so that the capacity of the priming cylinder 12 is at least as great as the capacity of the ejecting or high pressure cylinder 13. The cylinders 12 and 13 are co-axial or in concentric relation and their walls are machined or finished.

A discharge passage 28 extends longitudinally through the forward reduced head portion 24 to conduct the ejected lubricant to a discharge nozzle 29. A coupling or adapter 30 may serve to connect the nozzle 29 with the forward end of the head portion 24. An opening 31 of reduced diameter connects the forward end of the cylinder 13 with the discharge passage 28. A valve 32 seats inwardly or rearwardly against the restriction provided by the opening 31 and is urged to its closed position by a spring 33. The spring 33 may be arranged under compression between the adapter 30 and the valve 32 and is sufficiently strong to hold the valve closed to prevent a reverse or return flow of air and/or lubricant and to prevent the bleeding of the lubricant from the gun. The forward or outer part of the valve 32 is slotted and provided with a longitudinal opening 34 to permit the free discharge of the lubricant.

The rams 14 and 15 are operable in the cylinders 12 and 13, respectively, and are related for relative longitudinal movement. As illustrated in the drawings the rams 14 and 15 are telescopically related or arranged one within the other. The ram 14 is the outer ram, being a tubular cylindrical member, and the ram 15 is the inner ram, being an elongate rod-like part extending through the outer ram 14. The outer ram 14 is proportioned to accurately fit the charging or priming cylinder 12 with working clearance while the ram 15 accurately fits the high pressure cylinder 13 with mechanical or working clearance. The inner ram 15 extends completely through the outer ram 14 and is of sufficient length to have full movement in the cylinder 13 when the ram 14 is in its forward position in the cylinder 12. A tube 36 is threadedly connected with the rear end of the ram 14 and extends rearwardly in the body 10. The follower F surrounds and moves along the tube 36. The sealing ring 18 of the follower F has active sealing engagement with the tube 36. A packing assembly 37 is arranged between an internal shoulder 38 on the tube 36 and the rear end of the ram 14 and seals about the high pressure ram 15.

The control and operating means 16 is manually operable to reciprocate the rams 14 and 15 in a special manner to provide for charging of the priming cylinder 12, the charging of the high pressure cylinder 13, and the ejection of the charge from the high pressure cylinder 13 with these operations taking place in the order named. The means 16 is manually actuated and comprises an operating stem 39 connected to the high pressure ram 15 and an operating handle 40 on the stem 39. The stem 39 may be a rearwardly extending continuation of the ram 15 and passes rearwardly through the tube 36. The operating stem 39 extends through a tubular bushing or nut 41 carried by the cap 17 and its projecting rear part carries the handle 40. The nut 41 is removably threaded in an opening 42 in the cap 17 and its accessible rear part is knurled for ready turning. The handle 40 may be a suitable pistol grip. It will be seen that the handle 40 may be operated to directly manually reciprocate the high pressure ram 15 relative to the body 10. In the construction illustrated the forward part of the operating stem 39 is of enlarged diameter to provide a rearwardly facing annular shoulder 44. A tubular nut or bushing 45 is threaded in the rear end of the tube 36 and the shoulder 44 is engageable with the nut 45 to limit the rearward travel of the ram 15 relative to the ram 14, although this action does not normally take place. In a like manner the bushing 45 may engage against the nut 41 to limit the rearward travel of the tube 36 and the ram 14 so that the engagement of the bushing 45 with the nut 41 may limit the rearward travel of the ram 15 relative to the body 10. The shank 46 of the handle 40 is adapted to engage against the nut 41 to limit the forward stroke of the ram 15 relative to the body 10.

The control and operating means 16 further includes a latch mechanism or detent mechanism for causing movement of the charging ram 14 with the high pressure ram 15 during a phase or portion of the forward stroke of the ram 15, and during a phase or portion of the return stroke of the ram 15. This detent mechanism includes an annular groove 47 in the high pressure ram 15. The groove 47 is spaced rearwardly from the forward end of the ram 15. Spring urged elements on the ram 14 cooperate with the groove 47 to releasably connect the rams 14 and 15 for concerted movement. These elements may be in the nature of balls 48 shiftable in radial openings 49 in the ram 14. The balls 48 are adapted to project from the inner ends of the openings 49 to cooperate with the groove 47 and shiftable followers or blocks 50 may be arranged in the openings 49 to bear inwardly against the outer sides of the balls 48. An annular flange 51 is provided on the ram 14 in surrounding relation to the series of openings 49 and has a peripheral annular groove 52. A helical spring 53 is arranged in the groove 52 to urge the blocks 50 and the balls 48 inwardly. The spring 53 may be a straight helical spring shaped to constitute a ring and has its ends hooked together or otherwise connected. The outer faces of the blocks 50 are shaped to substantially conform to the spring 53. The groove 47 is of substantial depth and the spring urged balls 48 have extensive cooperation with the groove 47 so that a substantial force is required to unseat the balls from the groove 47 against the action of the spring 53. The spring 53 of course may be designed to urge the balls 48 inwardly with any selected force.

The parts are proportioned and related so that the forward ends of the rams 14 and 15 are substantially flush when the balls 48 are in cooperation with the groove 47. The two rams are in this relation at the beginning of the forward stroke. During the forward stroke of the operating stem 39 the rams 14 and 15 move together or as a unit until the ram 14 reaches the end of its forward stroke in the cylinder 12 or until the resistance to the forward movement of the ram 14 reaches a given value, at which time the balls 48 move out of the groove 47 by reason of the resistance to movement of the ram 14 and the ram 15 continues forwardly in its cylinder 13 while the ram 14 remains stationary. The concerted forward movement of the two rams 14 and 15 causes the positive displacement of the charge of lubricant from the cylinder 12 to the cylinder 13 and the subsequent independent movement of the ram 15 causes the positive high pressure displacement of the lubricant charge from the cylinder 13 through the opening 31 and passage 28 to the nozzle 29.

Upon the return stroke the ram 15 moves rearwardly relative to the ram 14 until the groove 47 reaches the series of balls 48. The balls 48 enter the groove 47 under the action of the spring 53 and serve to connect the ram 14 with the ram 15 to move rearwardly with the ram 15. Thus during the second or final portion of the return stroke the rams 14 and 15 move together as a unit to the position illustrated in Fig. 1. During this phase of the return stroke a substantial reduction in pressure is created in the communicating cylinders 12 and 13 and when the ram 14 leaves the cylinder 12 the lubricant under atmospheric pressure quickly flows into the cylinder 12. The lubricant under the action of the atmospheric pressure on the follower F completely occupies the priming cylinder 12 and may partially fill the cylinder 13. The lubricant under atmospheric pressure readily flows into the large diametered cylinder 12 which has full communication with the lubricant supply. Thus the priming cylinder 12 is primed or provided with a charge during the return stroke and this charge is displaced from the cylinder 12 to the cylinder 13 during the first phase of the forward stroke. As above described, the capacity of the cylinder 12 at least equals the capacity of the cylinder 13 and the displacement of the charge from the cylinder 12 to the cylinder 13 by the above-described concerted forward movement of the two rams 14 and 15 assures the complete, positive priming or charging of the cylinder 13.

The charging of the large diametered cylinder 12 is rapid and complete, and the charging of the cylinder 13 is complete and positive. It will be understood how the balls 48 freely ride on the cylindrical surface of the ram 15 during movement of the ram relative to the ram 14. The balls 48 under the action of the spring 53 enter the groove 47 to assure the positive return movement of the ram 14 with the ram 15 during the final portion of the return stroke. It will be observed that the return stroke is accompanied by a substantial evacuation action which assures the full charging of the priming cylinder 12 by the lubricant under atmospheric pressure.

The above operations may be repeated until the supply of lubricant in the body 10 is depleted. When this occurs the head 11 is unthreaded from the body 10 and the forward portion of the body is introduced into a supply of the lubricant. The nut 41 is unthreaded from the cap 17 and the stem 39 is moved rearwardly. The resultant rearward movement of the tube 36 and ram 14 is transmitted to the follower F by the engagement of the flange 51 with the follower, and the rearwardly moving follower draws a replacement charge of lubricant into the body 10. The head 11 is then replaced and the nut 41 threaded into its opening 42 to put the device in condition for further use.

The form of the invention illustrated in Figs. 6 to 9, inclusive, of the drawings may be said to comprise, generally, a body 10 for containing a supply of lubricant under atmospheric pressure, a head 11 on the forward end of the body 10 having a priming cylinder 12, and an ejecting or high pressure cylinder 13, rams 14ª and 15ª operable in the cylinders 12 and 13, respectively, and control and operating means 16ª for the rams 14ª and 15ª. The body 10, the head 11 and the follower F of the structure illustrated in Figs. 6 to 9, inclusive, may be the same as in the preceding form of the invention.

The ram 14ª is substantially the same as the ram 14, being a cylindrical tubular member designed for operation in the charging cylinder or priming cylinder 12. A tube 36ª is threaded on the rear portion of the ram 14ª and extends rearwardly through the body. In this construction the tube 36ª may have its forward end bearing against an annular flange 60 on the ram 14ª. The ram 15ª is similar to the ram 15, being a simple cylindrical element of uniform diameter operable in the high pressure cylinder or ejecting cylinder 13. The ram 15ª extends completely through the ram 14ª and its rear portion projects into the tube 36ª. A packing assembly 61 may be arranged between an internal shoulder 62 on the tube 36ª and the rear end of the ram 14ª to provide a lubricant tight seal about the ram 15ª.

The control and operating means 16ª is manually operable to reciprocate the rams 14ª and 15ª in their cylinders 12 and 13 in a given relation or in a special manner to provide for the displacement of the lubricant charge from the cylinder 12 to the cylinder 13 and the displacement or ejection of the charge from the cylinder 13 during the forward stroke, and to provide for the initiation of the priming or charging of the cylinder 12 during the first portion of the return stroke.

The means 16ª includes a stem 63 resembling the above described stem 39 and connected with or forming a continuation of the high pressure ram 15ª. The operating stem 63 extends rearwardly through the tube 36ª and passes through the nut 41 to project from the rear end of the cap 17. A suitable pistol grip handle 40 may be fixed to the rear end of the stem 63. The ram 15ª is, of course, directly manually operated by operation of the handle 40.

The means 16ª further includes a novel latch means or detent means for connecting the ram 14ª with the ram 15ª during certain phases of the operation. In this form of the invention the detent means is provided in the rear portion of the device and includes two longitudinally spaced annular grooves 64 and 65 in the operating stem 63. The front groove 64 is spaced rearwardly from the shoulder 44ª of the stem 63. An extension section 66 is threaded into the rear end of the tube 36ª and slidably passes the stem 63. A plurality of spaced radial openings 67 is provided in the section 66 and balls 68 are contained in the openings 67 to cooperate with the grooves 64 and 65. Longitudinal grooves 69 are provided in the section 66 and extend rearwardly from the openings 67 and leaf springs 70 extend through the grooves 69 to cooperate with the balls 68. The springs 70 serve to urge the balls 68 inwardly to have the desired cooperation with the grooves 64 and 65. A cap 71 is force-fitted over the rear end of the section 66 and overlies the springs 70 to urge the springs inwardly against the balls 68 and to hold the springs in place. The rear end portions of the springs 70 may be gripped or clamped between the end of the section 66 and the cap 71 to assure the proper retention of the springs. The springs 70 are yieldable to allow the balls 68 to move outwardly from the grooves 64 and 65 when there is a given resistance to movement of the ram 14ª with the ram 15ª.

The parts are related so that the forward ends of the rams 14ª and 15ª are in substantially the same plane when the balls 68 are in latched engagement with the front groove 64 and so that the ram 15ª projects forwardly from the ram 14ª a distance substantially equal to the length of the cylinder 13 when the balls 68 cooperate with the rear groove 65. The cooperation of the ram 14ª with the forward wall of the cylinder 12, or with the lubricant in the cylinder 12, is adapted to limit the forward stroke of the ram, while the cooperation of the cap 71 with the nut 41 may limit the rearward stroke of the ram 14ª. The engagement of the handle shank 46 with the nut 41 may limit the forward movement of the ram 15ª and the cooperation of the shoulder 44ª with the section 66 may limit the rear movement of the ram 15ª with respect to the ram 14ª. The shoulder 44ª is adjacent to or in cooperation with the forward end of the section 66 when the balls 68 are in latching cooperation with the front groove 64.

In operating the grease gun illustrated in Figs. 6 to 9 the nozzle 29 is suitably engaged with the fitting to receive the lubricant and the handle 40 is reciprocated to effect the ejection of charges of lubricant into the fitting. At the start of the forward stroke the parts are in the positions illustrated in Fig. 6 with the balls 68 engaging in the front groove 64. The balls 68 cooperating with the front groove 64 cause the arm 14ª to travel forwardly with the ram 15ª to displace the charge of lubricant from the cylinder 12 into the cylinder 13. The ram 14ª continues to move forwardly to the end of its stroke or until the resistance to its forward movement becomes so great that it overcomes the latching engagement of the spring urged balls 68 with the groove 64. The ram 15ª continues to move forwardly to enter the cylinder 13 and the forward groove 64 moves out of cooperation with the balls 68. The ram 15ª moves forwardly through the cylinder 13 to eject the charge of lubricant through the passage 28 and the nozzle 29 under a substantial pressure. In this connection it is to be observed that the lubricant is ejected from the cylinder 13 by the direct manual thrust without resistance offered by a return spring, or the like.

The high pressure ram 15ª moves forwardly to the end of its forward stroke and upon or during its return stroke the rear groove 65 engages or receives the spring urged balls 68. The engagement of the balls 68 in the groove 65 connects the ram 14ª with the ram 15ª to return with the ram 15ª during the return stroke of the same. The low pressure ram or priming ram 14ª moves rearwardly with the ram 15ª to leave the cylinder 12 and continues moving rearwardly until the cap 71 engages the nut 41. This engagement of course stops the rearward travel of the ram 14ª and the groove 65 moves rearwardly out of cooperation with the balls 68. The return movement of the ram 14ª just described takes place during the initial phase of the return stroke of the ram 15ª and is completed while the ram 15ª is still in its cylinder 13. When the ram 14ª leaves its cylinder 12 the lubricant from the main lubricant supply immediately enters or fills in the cylinder 12 under the action of the atmospheric pressure working against the follower F. The lubricant may continue to flow into the cylinder 12 during the remaining phase of return movement of the ram 15ª. The ram 15ª continues its rearward travel to the end of its return stroke, at which time the front groove 64 comes into position to receive the balls 68. This reconnects the ram 14ª with the ram 15ª for the next ejecting stroke.

The operation of the grease gun illustrated in Figs. 6 to 9 is characterized by the fact that the lubricant has a substantial time interval to fill or occupy the priming cylinder 12 before the forward stroke is initiated. The ram 14ª leaves the cylinder 12 during the initial phase of the return stroke leaving a substantial period of time for the cylinder to fill with a charge of lubricant. Thus the full charging of the ejecting mechanism is assured. It is to be noted that the grooves 64 and 65 of the latch mechanism or detent mechanism may be formed in a portion of the ram and stem structure that is of substantial diameter. With this location of the grooves the grooves do not tend to weaken the structure. The body 10 may be filled with lubricant from time to time as described above in connection with the preceding form of the invention.

The embodiment of the invention illustrated in Figs. 10, 11 and 12 may be said to comprise, generally, a body 10, a head 11 on the body 10 having concentric cylinders 12 and 13, rams 14 and 15 operable in the cylinders 12 and 13, and control and operating means 16ᵇ for the rams. The construction illustrated in Figs. 10, 11 and 12 may be identical with that shown in Figs. 1 to 5, inclusive, with the exception of certain elements of the means 16ᵇ and corresponding reference numerals designate corresponding parts of the two embodiments of the invention.

The control and operating means 16ᵇ includes an operating stem 39ᵇ connected with or forming a rearward extension of the ejecting ram 15 and extending rearwardly through the tube 36 and the nut 41 to carry the operating handle 40. The means 16ᵇ further includes the groove 47 in the ram 15, the balls 48 and the blocks 50 in the openings 49, and the spring 53 urging the blocks 50 and the balls 48 inwardly so that the balls cooperate with the groove 47, all as described above. In this form of the invention the control and operating means 16ᵇ operates to automatically return the charging or priming ram 14 to its rearmost position at the completion of its forward stroke to provide for the charging or filling of the cylinder 12 during the active forward stroke of the ram 15.

The means 16ᵇ is characterized by a power means or spring means for restoring or returning the ram 14. The spring return means comprises a spring 80 connected with the ram 14 and connected with the operating stem 39ᵇ. The spring 80 is preferably in the form of a helical extensible tension spring arranged in the tube 36 in surrounding relation to the plunger 15. The forward end of the spring 80 is connected with the ram 14 and the rear end of the spring is connected with the stem 39ᵇ. In the construction illustrated the forward end part of the spring 80 extends through an opening 81 in a washer 82 of the packing assembly 38 and has an ear or lug 83 turned down to bear against the forward face of the washer and the rear end of the spring 80 has a finger or lug 84 set in a socket 85 in the stem 39ᵇ and retained in the socket by the surrounding and confining tube 36. The spring 80 is under tension to urge the ram 14 rearwardly relative to the ram 15. The engagement of the bushing 45 with the nut 41 limits the rearward movement of the ram 14 and the parts are related so that the balls 48 cooperate with the groove 47 when the two rams 14 and 15 are in their rearmost positions. The spring 80 is of such strength that it does not overcome the holding or retraining cooperation of the balls 48 with the groove 47. However, upon the release of the balls 48 from the groove 47 the spring 80 quickly returns the ram 14 to its rearmost position and this action takes place during forward movement of the ram 15.

In the operation of the grease gun illustrated in Figs. 10, 11 and 12 the nozzle 29 is engaged against or connected with a lubricant receiving fitting and the pistol grip or handle 40 is reciprocated to operate the gun. During the forward stroke the balls 48 cooperating with the groove 47 connect the ram 14 with the ram 15 so that the two rams move forwardly together. The two rams enter the cylinder 12 and displace the charge of lubricant from this cylinder to the cylinder 13. This supplies a full charge of lubricant to the ejecting cylinder or high pressure cylinder 13. When the ram 14 reaches the end of its forward stroke or when the resistance to its forward movement overcomes the holding cooperation of the balls 48 with the groove 47 the balls snap out of the groove 47 to release the ram 14 from the ram 15. When this occurs the spring 80 quickly moves the ram 14 rearwardly to its rearmost position. The ram 15 continues forwardly to eject the charge of lubricant from the cylinder 13. The rearward withdrawal of the ram 14 from the cylinder 12 during the forward movement of the ram 15 provides an evacuating action or produces a low pressure in the cylinder 12 so that the lubricant rapidly fills in the cylinder 12. The lubricant under atmospheric pressure contained in the body 10 and the chamber 26 fully fills the cylinder 12.

When the forward stroke of the ram 15 is completed the handle 14 is moved rearwardly to return the ram 15. At the end of the return stroke the groove 47 comes into cooperation with the balls 48 so that the rams 14 and 15 are reconnected for the succeeding operation. The rearward withdrawal of the ram 15 from the cylinder 13 provides a low pressure in the cylinder 13 and lubricant may flow from the cylinder 12 to the cylinder 13. It is to be observed that the cylinder 12 is opened to the main supply of lubricant under atmospheric pressure at the start or initiation of the active forward stroke of the ram 15 in the cylinder 13. Accordingly the lubricant may fill into the cylinder 12 throughout the active forward stroke of the ram 15 and during the entire return stroke of the ram 15. This allows sufficient time for very heavy lubricant to fully charge the cylinder 12.

In the three forms of the invention described above atmospheric pressure acting on the follower F is utilized as a priming force to fill the cylinder 12 with lubricant. In each of the forms the manual forward stroke serves to transfer or displace the charge of lubricant from the priming cylinder 12 to the ejecting cylinder 13 and the directly applied manual force is utilized to positively move the high pressure ram 15 or 15a through the cylinder 13 to eject the lubricant. In each case a full charge of lubricant is supplied to the high pressure cylinder 13 at each operation. The priming cylinder 12 is at least as large in capacity as the ejecting cylinder 13 and the positive displacing action of the ram 14 assures the displacement of a full charge of lubricant from the cylinder 12 to the cylinder 13. In each form of the invention an ample time interval is allowed for the charging of the cylinder 12 by the action of atmospheric pressure on the lubricant supply. In the form of the invention illustrated in Figs. 1 to 4, inclusive, the cylinder 12 fills with lubricant during the second or final stage of the return stroke of the ram 15, in the form of the invention shown in Figs. 6 to 9, inclusive, the cylinder 12 is filled with lubricant throughout the return stroke of the ram 15a, and until the rams 14a and 15a re-enter the cylinder 12, while in the structure illustrated in Figs. 10, 11 and 12 the cylinder 12 may fill with lubricant throughout the time interval required for the forward movement of the ram 15 through the cylinder 13 and for the full return movement of the ram 15 to its initial position.

Having described only typical preferred forms and applications of my invention, I do not wish to be limited or restricted to the specific details herein set forth, but wish to reserve to myself any variations or modifications that may appear to those skilled in the art or fall within the scope of the folowing claims.

Having described my invention, I claim:

1. A grease gun comprising a body having a lubricant reservoir, a charging cylinder in lubricant receiving relation to the reservoir, and a second cylinder continuing outwardly from the charging cylinder, a charging ram operable in the charging cylinder, an ejecting ram operable in the second cylinder, said rams being related for relative longitudinal movement, and releasable means connecting the rams to move as a unit through the charging cylinder to displace a lubricant charge therefrom into the second cylinder and releasable to allow continued movement of the ejecting ram in the second cylinder to eject the charge therefrom.

2. A grease gun comprising a body having a lubricant reservoir, a charging cylinder in lubricant receiving relation to the reservoir, and a second cylinder continuing outwardly from the charging cylinder, a charging ram operable in the charging cylinder, an ejecting ram operable in the second cylinder, the rams being related for relative longitudinal movement, means for operating the ejecting ram, and latch means releasably connecting the charging ram with the ejecting ram to move therewith during the forward stroke of the ejecting ram so that the rams displace lubricant from the charging cylinder to the second cylinder, releasable to free the ejecting ram for continued individual movement to eject the lubricant from the second cylinder.

3. A grease gun comprising a body having a lubricant reservoir, a charging cylinder in lubricant receiving relation to the reservoir and an ejecting cylinder of smaller diameter and greater length than the charging cylinder and extending forwardly from the charging cylinder in coaxial relation thereto, an ejecting ram adapted to move through the charging cylinder and operate in the ejecting cylinder to eject charges of lubricant therefrom, means for reciprocating the ejecting ram, a charging ram in surrounding relation to the ejecting ram and adapted to operate in the charging cylinder, and releasable means connecting the charging ram with the ejecting ram for movement in the charging cylinder to displace lubricant therefrom into the ejecting cylinder during the initial phase of forward movement of the ejecting ram and releasable at the completion of said displacement to provide for continued forward movement of the ejecting ram.

4. A grease gun comprising a body having a lubricant reservoir, a charging cylinder in lubricant receiving relation to the reservoir and an ejecting cylinder of smaller diameter and greater length than the charging cylinder and extending forwardly from the charging cylinder in coaxial relation thereto, an ejecting ram adapted to move through the charging cylinder and operate in the ejecting cylinder to eject charges of lubricant therefrom, means for reciprocating the ejecting ram, a charging ram in surrounding relation to the ejecting ram and adapted to operate in the charging cylinder, a movable element in the reservoir engaging the lubricant and exposed to atmospheric to feed the lubricant into the charging cylinder, and means for moving the charging ram into the charging cylinder during the forward stroke of the ejecting ram and before the ejecting ram enters the ejecting cylinder to displace a charge of lubricant into the ejecting cylinder, the last named means comprising a detent means for connecting the rams and releasable at the end of the forward stroke of the charging ram.

5. A grease gun comprising a body having a lubricant reservoir, a charging cylinder in lubricant receiving relation to the reservoir, and a second cylinder continuing outwardly from the charging cylinder, a charging ram operable in the charging cylinder, an ejecting ram operable in the second cylinder, the rams being relatively shiftable and in telescopic relation, means for reciprocating the ejecting ram, there being a groove in one ram, and a latch part on the other ram cooperable with the groove to cause movement of the charging ram with the ejecting ram to eject a charge of lubricant from the charging cylinder to the second cylinder during the forward stroke of the ejecting ram and releasable from the groove to allow the individual continued forward movement of the ejecting ram to eject said charge from the second cylinder.

6. A grease gun comprising a body having a lubricant reservoir, a charging cylinder in lubricant receiving relation to the reservoir, and a second cylinder continuing outwardly from the charging cylinder, a charging ram operable in the charging cylinder, an ejecting ram operable in the second cylinder, the rams being relatively shiftable and in telescopic relation, means for reciprocating the ejecting ram, there being a groove in one ram, a latch part on the other ram cooperable with the groove to cause movement of the charging ram with the ejecting ram to eject a charge of lubricant from the charging cylinder to the second cylinder during the forward stroke of the ejecting ram and releasable from the groove to allow the individual continued forward movement of the ejecting ram to eject said charge from the second cylinder, and means for thereafter re-engaging the latch part in the groove to cause return of the charging ram.

7. A grease gun comprising a body having a lubricant reservoir, a charging cylinder in lubricant receiving relation to the reservoir and an ejecting cylinder of smaller diameter and greater length than the charging cylinder and extending forwardly from the charging cylinder, means for reciprocating the ejecting ram to eject charges of lubricant from the ejecting cylinder, a movable element in the reservoir engaging the lubricant and exposed to atmospheric pressure to feed charges of lubricant into the charging cylinder, and ram means for displacing charges of lubricant from the charging cylinder to the ejecting cylinder, said ram means comprising a ram operable in the charging cylinder, and means for connecting the last named ram with the ejecting ram during the first phase of its forward stroke.

8. A grease gun comprising a body having a lubricant reservoir, a charging cylinder in lubricant receiving relation to the reservoir and an ejecting cylinder of smaller diameter and greater length than the charging cylinder and extending forwardly from the charging cylinder, an ejecting ram operable in the ejecting cylinder, means for reciprocating the ejecting ram to eject charges of lubricant from the ejecting cylinder, a charging ram in shiftable surrounding relation to the ejecting ram and operable in the charging cylinder, there being a groove in the ejecting ram, and a part on the charging ram cooperating with the groove to cause the charging ram to move forwardly with the ejecting ram to displace lubricant from the charging cylinder to the ejecting cylinder, releasable from the groove when said displacement is complete and re-engaged in the groove during the return stroke of the ejecting ram to return the charging ram.

9. A grease gun comprising a body having a lubricant reservoir, a charging cylinder in lubricant receiving relation to the reservoir and an ejecting cylinder of smaller diameter and greater length than the charging cylinder and extending forwardly from the charging cylinder, an ejecting ram operable in the ejecting cylinder, means for reciprocating the ejecting ram to eject charges of lubricant from the ejecting cylinder, a charging ram in shiftable surrounding relation to the ejecting ram and operable in the charging cylinder, there being a groove in the ejecting ram, a part on the charging ram cooperating with the groove to cause the charging ram to move forwardly with the ejecting ram to displace lubricant from the charging cylinder to the ejecting cylinder, releasable from the groove when said displacement is complete, and means for returning the charging ram upon the release of said part to allow recharging of the charging cylinder during the forward stroke of the ejecting ram.

10. A grease gun comprising a body having a lubricant reservoir, a charging cylinder in lubricant receiving relation to the reservoir and an ejecting cylinder of smaller diameter and greater length than the charging cylinder and extending forwardly from the charging cylinder, an ejecting ram operable in the ejecting cylinder, means for reciprocating the ejecting ram to eject charges of lubricant from the ejecting cylinder, a charging ram in shiftable surrounding relation to the ejecting ram and operable in the charging cylinder, there being a groove in the ejecting ram, a part on the charging ram cooperating with the groove to cause the charging ram to move forwardly with the ejecting ram to displace lubricant from the charging cylinder to the ejecting cylinder, releasable from the groove when said displacement is complete, and means for returning the charging ram upon the release of said part to allow recharging of the charging cylinder during the forward stroke of the ejecting ram, the last named means including a return spring connected with the charging ram.

11. A grease gun comprising a body having a lubricant reservoir, a charging cylinder in lubricant receiving relation to the reservoir, and a second cylinder continuing outwardly from the charging cylinder, a charging ram operable in the charging cylinder, an ejecting ram operable in the second cylinder, means for reciprocating the ejecting ram, and releasable means connecting the charging ram with the ejecting ram to move therewith during the first phase of its forward stroke to displace lubricant from the charging cylinder into the second cylinder and releasable when said displacement is complete and operable to reconnect the charging ram with the ejecting ram during the first phase of return movement of the ejecting ram to restore the charging ram.

12. A grease gun comprising a body having a lubricant reservoir, a charging cylinder in lubricant receiving relation to the reservoir and an ejecting cylinder of smaller diameter and greater length than the charging cylinder and extending forwardly from the charging cylinder, an ejecting ram operable in the ejecting cylinder, means for reciprocating the ejecting ram to eject charges of lubricant from the ejecting cylinder, a charging ram in shiftable surrounding relation to the ejecting ram and operable in the charging cylinder, there being a groove in the ejecting ram, and a part on the charging ram cooperating with the groove to cause the charging ram to move forwardly with the ejecting ram to displace lubricant from the charging cylinder to the ejecting cylinder during the first phase of the forward stroke, there being a second groove in the ejecting ram releasably engaged by said part to return the charging ram during the return stroke of the ejecting ram.

13. A grease gun comprising a body having a lubricant reservoir, a charging cylinder in lubricant receiving relation to the reservoir, and a second cylinder continuing outwardly from the charging cylinder, a charging ram operable in the charging cylinder, an ejecting ram operable in the second cylinder, the rams being relatively shiftable and in telescopic relation, means for reciprocating the ejecting ram, there being a groove in one ram, and spring pressed balls on the other ram cooperable with the groove to cause movement of the charging ram with the ejecting ram to eject a charge of lubricant from the charging cylinder to the second cylinder during the forward stroke of the ejecting ram and releasable from the groove to allow the individual continued forward movement of the ejecting ram to eject said charge from the second cylinder.

NEIL V. SMITH.